Sept. 27, 1927.

H. T. MAZE ET AL 1,643,414

PLANTER ATTACHMENT

Filed April 3, 1926

Inventors
H. T. Maze
& L. Bever.
By Watson E. Coleman
Attorney

Sept. 27, 1927.
H. T. MAZE ET AL
1,643,414
PLANTER ATTACHMENT
Filed April 3, 1926  2 Sheets-Sheet 2
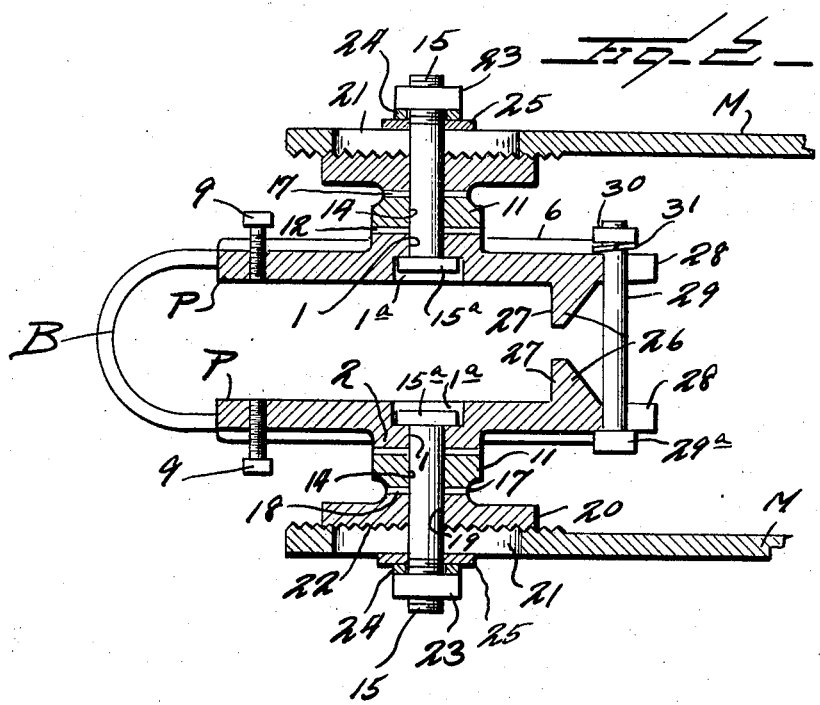
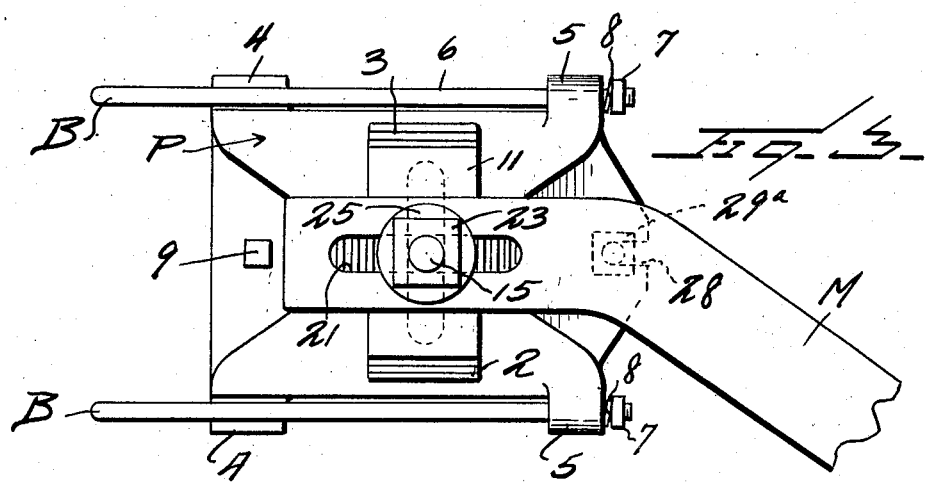
Inventors
H. T. Maze
L. Bever.
By Watson E. Coleman
Attorney Patented Sept. 27, 1927.

1,643,414

UNITED STATES PATENT OFFICE.

HARRY T. MAZE AND LOYD BEVER, OF ANDERSON, INDIANA.

PLANTER ATTACHMENT.

Application filed April 3, 1926. Serial No. 99,594.

This invention relates to a planter attachment and has relation more particularly to a device of this kind especially designed and adapted for use in connection with a corn planter, and it is an object of the invention to provide means whereby the deposited seeds are uniformly covered and effectively protected against birds and fowls.

Another object of the invention is to provide covering members which, when in applied position, trail a shoe of the planter and which may be readily adjusted in accordance with the requirements of practice and particularly as may be necessitated by different conditions of the soil.

The invention consists in the details of construction and in the combination and arrangement of the several parts of our improved planter attachment whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in side elevation illustrating an attachment constructed in accordance with an embodiment of our invention in applied position, a coacting portion of a planter being diagrammatically indicated;

Figure 2 is a horizontal sectional view taken through our improved attachment as herein disclosed with portions of the covering members being broken away;

Figure 3 is a view in side elevation of the structure as illustrated in Figure 2;

Figure 4 is a view in elevation of one of the side plates herein employed;

Figure 5 is a view in end elevation of the plate as illustrated in Figure 4;

Figure 6 is a view in elevation of a spaced plate herein employed;

Figure 7 is a view in side elevation of the plate illustrated in Figure 6;

Figure 8 is an elevational view of the plate opposite to that illustrated in Figure 6.

As disclosed in the accompanying drawings, T denotes a seed tube or riser of a conventional type leading to the rear portion of the shoe S, said tube or riser T and shoe S being of a conventional type employed in connection with planters and more particularly corn planters.

Positioned in advance of the runner R is a furrow opener F preferably of a disk type.

Our improved attachment comprises the plates P adapted to be applied at opposite sides of the tube or riser T. Each of these plates P is of requisite dimensions and configuration and at its central portion is provided with a transversely disposed slot 1 having its inner portion $1^a$ transversely enlarged as particularly illustrated in Figure 2. The outer portion of the slot 1 is defined by an outstanding relatively broad flange 2 the outer face of which being provided thereacross with the teeth 3 or otherwise roughened.

The plate P at its corners or at the extremities of its upper and lower edges is provided with the outstanding lugs 4 and 5, the lugs 4 at one end of the plate having concave faces $4^a$ disposed in a direction opposed to the concave faces $5^a$ of the lugs 5 at the opposite end of the plate.

Between each set of longitudinally spaced lugs 4 and 5 is disposed a leg 6 of a U-bolt B, said bolt B straddling the tube or riser T from in front. The free extremity of each of the legs 6 has engaged therewith a holding nut 7 coacting with a lug 5. Interposed between the nut 7 and lug 5 is a lock washer 8 of any preferred type but preferably a split spring washer.

The applied bolts B effectively maintain the plates P in applied position with respect to the tube or riser T but to further prevent said plates having vertical displacement with respect to the tube or riser T, a binding screw 9 is threaded through the central rear portion of each of the plates P for contact with the adjacent portion of the tube or riser.

Overlying the outer face of the flange 2 of each of the plates P is a spacer plate 11, the inner face of which being provided with the teeth 12 or otherwise roughened for locking engagement with the teeth 3 of the flange 2 whereby the plate 11 may be effectively held against independent movement in a direction lengthwise of the slot 1.

The central portion of the plate 11 is provided therethrough with an opening 14 which, when the plate 11 is in applied position, registers with the slot 1. Disposed from without through the slot 1 and the plate P and the registering opening 14 in the plate 11 is a bolt 15 the head 15ᵃ of which being confined within the enlarged inner portion 1ᵃ of the slot 1 as is particularly illustrated in Figure 1, whereby said bolt 15 may be adjusted lengthwise of the slot 1 without the necessity of removing the plate P from applied position.

The opening 14 is defined by an outstanding boss or sleeve 16 the outer edge of which being provided with the radially disposed teeth 17 adapted to interlock with similar teeth provided in the outer end of the sleeve or boss 18 defining the central opening 19 in a second plate 20. In the assembly of our attachment, the plate 20 has its longitudinal axis angularly disposed with respect to the longitudinal axis of the plate 11 and the bolt 15 is disposed through the central opening 19.

The bolt 15 is also of a length to be directed through the longitudinally disposed slot 21 provided in an end portion of the covering member M. The outer face of the plate 20 and the coacting inner face portion of the member M are provided with the interlocking teeth 22.

The outer extremity of the bolt 15 has engaged therewith a conventional nut 23 which provides means whereby the associated plates P, 11 and 20 and member M may be effectively locked or held in desired adjusted position. The nut 23 coacts through the medium of an interposed lock washer 24 with a washer 25 in direct contact with the outer face of the adjacent portion of the member M and of a maximum diameter materially in excess of the width of the slot 21.

The forward portions of the plates P are provided with the inwardly disposed flanges 26 extending transversely thereof and which provide shoulders 27 for direct contact or abutment with the rear face of the tube or riser T whereby the maintenance of the attachment in applied position is further facilitated. The central portions of the plates P in advance of the flanges 26 are provided with the open slots 28 in which are received the opposite end portions of a tie bolt 29. The head 29ᵃ of the bolt 29 contacts with the outer face of one of the plates P while coacting with the outer face of the second plate P is the holding nut 30. Preferably interposed between said holding nut 30 and the adjacent plate P is a lock washer 31. The bolt 29 together with its nut 30 provides further means to maintain effectually the attachment in working position.

Each of the members M when in applied position is disposed on such downward incline and arranged on such curvature to assure an effective covering for the deposited seed, such seed being covered to an extent determined by the position or location of the members M resulting from the relative adjustment of the several plates hereinbefore referred to and of a member M with respect to its associated plate 20.

In practice, it has been found of best advantage to have the members M so adjusted to cover the deposited seed at a depth of approximately one inch, such covering being further assured by the travel thereover of one of the traction wheels of the planter which, as is well known, is positioned directly behind a runner R.

By effectively covering the seed immediately after planting, such deposited seed is protected against ravages of birds or fowls. Furthermore, this covering of the seed assures a stand in either wet or dry weather, with no weeds about the stand. The seeds or grains of corn have uniform depth and are effectively covered irrespective of the conditions of the soil. If wet weather sets in, the seed will not rot as the seed has not been deposited too deep for a quick get up. If the weather should be dry, it is only necessary to harrow or plow in the soil and thereby planting the seed deeper. When weeds begin to show up it is possible to plow up close to the stands without cutting off any roots as the roots are sufficiently deep in the earth. This is of advantage as the necessity of using a hand hoe is avoided.

Our attachment for covering, as before stated, assures the corn or stands to be deeply rooted so that they cannot be easily blown down. It has also been found as a result of the use of our improved attachment that corn increases in strength and produces heavier.

From the foregoing description it is thought to be obvious that a planter attachment constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with a planter having a shoe and a seed tube associated therewith, plates arranged at opposite sides of the tube, means for holding the plates to the tube, each of said plates having an elongated slot, an outstanding shank held by the plate and extending outwardly through the slot, a second plate overlying the first named plate and having an opening through which the shank is directed, a third plate having an opening through which the shank is directed, said second and third plates being adjustable one with respect to the other about the shank as an axis, a covering member having a slot through which the shank is directed, and means carried by said shank for holding the plates and covering member in their relative adjustments, the opposed faces of the third plate and covering member having interlocking surfaces, the slot in the covering member being angularly related to the slot of the first named plate.

2. In combination with a planter having a shoe and a seed tube associated therewith, plates arranged at opposite sides of the tube, means for holding the plates to the tube, each of said plates having an elongated slot, an outstanding shank held by the plate and extending outwardly through the slot, a second plate overlying the first named plate and having an opening through which the shank is directed, a third plate having an opening through which the shank is directed, said second and third plates being adjustable one with respect to the other about the shank as an axis, a covering member having a slot through which the shank is directed, and means carried by said shank for holding the plates and covering member in their relative adjustments, the opposed faces of the third plate and covering member having interlocking surfaces, the slot in the covering member being angularly related to the slot of the first named plate, the first named plates being provided with inwardly disposed flanges for contact with the rear face of the seed tube.

In testimony whereof we hereunto affix our signatures.

HARRY T. MAZE.
LOYD BEVER.